United States Patent [19]
Itō

[11] Patent Number: 4,510,589
[45] Date of Patent: Apr. 9, 1985

[54] SYSTEM FOR SECURING COMBINATION RADIO AND TAPE RECORDER

[75] Inventor: Hisao Itō, Osaka, Japan

[73] Assignee: Sanyo Electric Co., Ltd., Osaka, Japan

[21] Appl. No.: 336,082

[22] Filed: Dec. 31, 1981

[30] Foreign Application Priority Data

Jan. 20, 1981 [JP] Japan .................................. 56-7449

[51] Int. Cl.³ .............................................. G11B 31/00
[52] U.S. Cl. ..................................... 369/11; 360/137
[58] Field of Search ......................... D14/5, 6, 70, 72; 455/344, 347, 348, 350, 351; 369/10, 11, 12; 360/137

[56] References Cited

U.S. PATENT DOCUMENTS

| | | | |
|---|---|---|---|
| D. 262,017 | 11/1981 | Frakes, Jr. ....................... | D14/72 X |
| D. 265,821 | 8/1982 | Okada et al. .................... | D14/72 X |
| D. 269,177 | 5/1983 | Iijima ............................... | D14/72 X |
| 3,824,472 | 7/1974 | Engel et al. . | |
| 3,916,122 | 10/1975 | Sato et al. . | |
| 4,064,374 | 12/1977 | Sato ...................................... | 369/11 |
| 4,119,813 | 10/1978 | Sato ...................................... | 369/11 |
| 4,151,470 | 4/1979 | Sato .................................. | 369/11 X |

Primary Examiner—Aristotelis M. Psitos
Attorney, Agent, or Firm—Armstrong, Nikaido, Marmelstein & Kubovcik

[57] ABSTRACT

A coupling/uncoupling device for use in a combination appliance including a main appliance combined with an auxiliary appliance. The device includes an accommodation recess for accommodating the auxiliary appliance in it, which is formed in the main appliance, a first locking member for locking the auxiliary appliance at its accommodating position, a supporting member for supporting the auxiliary appliance in the accommodation recess, a second locking member for locking the supporting member, and a lock releasing member for releasing the locking of the auxiliary appliance and that of the supporting member simultaneously.

5 Claims, 21 Drawing Figures

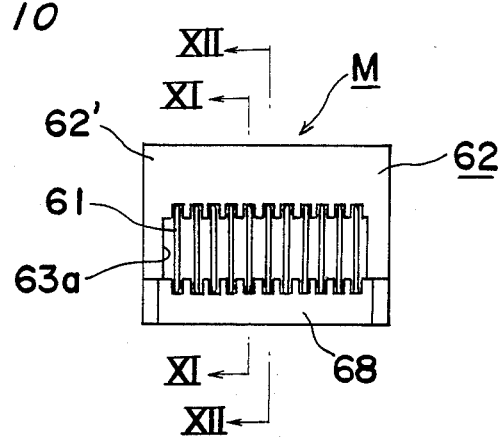
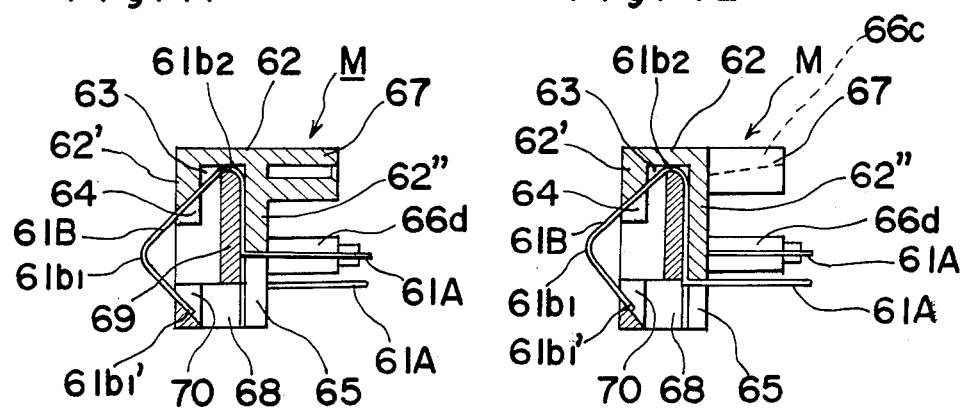
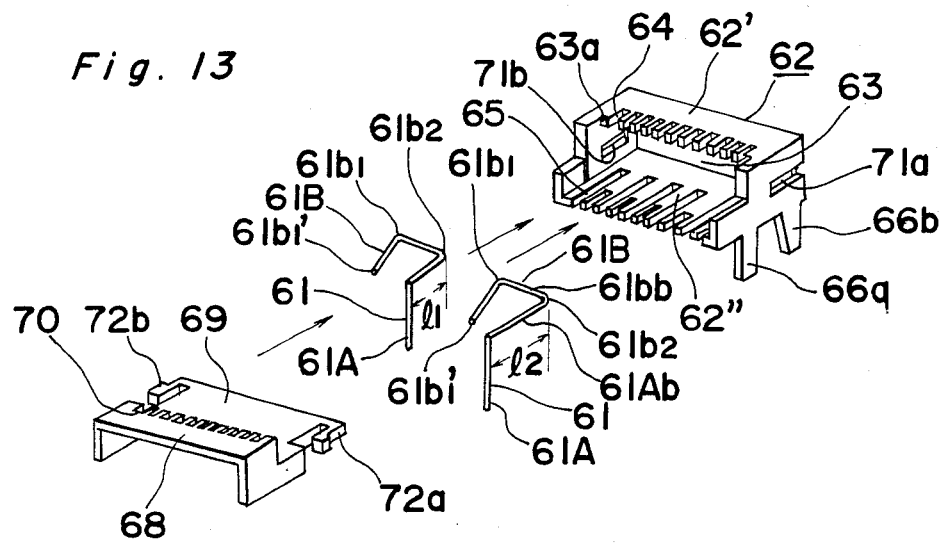

SYSTEM FOR SECURING COMBINATION RADIO AND TAPE RECORDER

BACKGROUND OF THE INVENTION

The present invention generally relates to a combination appliance in which a main appliance is combined with an auxiliary appliance, with the main and auxiliary appliances being arranged to be usable independently of each other and more particularly, to a coupling/uncoupling device for use in the combination appliance.

Conventionally, in combination audio appliances, for example, it has been so arranged that a radio set as the main appliance is combined with a tape recorder as the auxiliary appliance in the case of a radio set equipped with a tape recorder or a tape recorder as the main appliance is combined with a radio set as the auxiliary appliance in the case of a tape recorder equipped with a radio set so as to combine the portable auxiliary appliance with the main appliance so that the combination audio appliance may provide high-powered sound with improved quality through utilization of functions of the auxiliary appliance or enable simultaneous use of the main and auxiliary appliances through provision of other functions.

Generally, the following three methods have been conventionally employed for coupling of the auxiliary appliance with and its uncoupling from the main appliance.

Namely, in the first method, the auxiliary appliance is mounted onto the exterior, usually one of the side surfaces, through a hook or a fixture. However, the first method has such disadvantages that the insecure coupling of the auxiliary appliance with the main appliance tends to result in uncoupling of the auxiliary appliance from the main appliance even when subjected to a slight shock, etc., and electrical connecting portions between the main and auxiliary appliances become unstable since the number of the connecting portions is increased.

Then, in the second method, the main appliance is provided with an accommodating case for accommodating the auxiliary appliance therein and, after the auxiliary appliance has been acommodated into the accomodating case, the accommodating case is fitted into the interior of the main appliance as in the case where a cassette is mounted on a tape recorder through a cassette holder. The second method also, however, has such inconveniences that the main appliance undesirably requires additional space for opening or closing the accommodating case from the main appliance, and there are required complicated operations in the sequence of opening of the accommodating case, accommodating of the auxiliary appliance into the accommodating case and closing of the accommodating case.

Finally, in the third method, it is so arranged that the auxiliary appliance is directly accommodated into an accommodating recess formed in the main appliance equipped with a locking means for locking the auxiliary appliance at the accommodating position and with an ejecting means for ejecting the auxiliary appliance out of the accommodating recess, and the auxiliary appliance is selectively locked at the accommodating position by the locking means and ejected out of the accommodating recess by the ejecting means when the auxiliary appliance has been accommodated fully and is taken out of the main appliance, respectively. However, the third method has such disadvantages that, since the auxiliary appliance is locked at the accommodating position while an urging force of the ejecting means is being applied to the auxiliary appliance at all times in a direction of ejection of the auxiliary appliance, the auxiliary appliance undisirably requires to be so arranged to be locked at its longitudinal central portion so as to balance the locking force of the locking means with the urging force of the ejecting means and obtain a constant stroke of the auxiliary appliance up to the accommodating position, that is, minimize a difference in stroke of the auxiliary appliance between a case where the auxiliary appliance is pushed at one of the longitudinal opposite ends and a case where it is pushed at its longitudinal central portion, so that it becomes extremely difficult to obtain a small-sized auxiliary appliance due to arrangements of components related thereto, etc.

SUMMARY OF THE INVENTION

Accordingly, an essential object of the present invention is to provide an improved coupling/uncoupling device for use in a combination appliance which is remarkably excellent in operational efficiency with substantial elimination of the disadvantages inherent in conventional coupling/uncoupling devices of this kind.

Another important object of the present invention is to provide an improved coupling/uncoupling device of the above described type which is simple in structure, highly reliable in actual use, suitable for mass production at low cost, and can be readily incorporated into combination appliances and the like at low cost.

In accomplishing these and other objects according to one preferred embodiment of the present invention, there is provided an improved coupling/uncoupling device for use in a combination appliance including a main appliance combined with an auxiliary appliance, with the main and auxiliary appliances being arranged to be usable independently, comprising: an accommodation recess for accommodating the auxiliary appliance therein, which is formed in the main appliance; a first locking member having a locking portion which is projected into the accommodation recess so as to lock the auxiliary appliance at an accommodating position thereof when the auxiliary appliance has been fully accommodated into the accommodation recess; a supporting member having supporting portions which are urged at all times by urging means in a direction opposite to that of accommodation of the auxiliary appliance so as to project into the accommodation recess; the supporting portions being arranged to hold the auxiliary appliance temporarily at a temporary accommodating position thereof by an urging force of the urging means so that a part of the auxiliary appliance may project out of the accommodating recess in the direction opposite to that of accommodation of the auxiliary appliance when the auxiliary appliance is initially accommodated into the accommodation recess so deeply as to come into contact with the supporting portions and being arranged to be ejected out of the accommodating recess in the direction of accommodation of the auxiliary appliance so as to be moved to an ejecting position thereof when the auxiliary appliance is further accommodated into the accommodation recess so as to reach the accommodating position, with a force greater than the urging force of the urging means being applied to the auxiliary appliance in the direction of accommodation of the auxiliary appliance; a second locking member for locking the supporting member at the ejecting position of the supporting portions; and a lock releasing member associated with a lock releasing button, which actuates the first and second locking members so as to release locking of the auxiliary appliance at the accommodating position thereof and locking of the supporting member at the ejecting position of the supporting portions, respectively when the lock releasing button is operated; all of the first locking member, supporting member, second locking member and lock releasing member being provided in the main appliance; whereby the auxiliary appliance is locked at the accommodating position thereof by the first locking member and the supporting member is locked at the ejecting position of the supporting portions by the second locking member when the auxiliary appliance has been fully accommodated into the accommodation recess so as to reach the accommodating position, and the locking of the auxiliary appliance through the first locking member and the locking of the supporting member through the second locking member are released simultaneously by the lock releasing member so as to push the auxiliary appliance up to the temporary accommodating position thereof in the direction opposite to that of accommodation of the auxiliary appliance by the supporting member through the urging force of the urging means when the lock releasing button is operated.

In accordance with the present invention, when the main appliance has been combined with the auxiliary appliance, an undesirable urging force of the urging means of the supporting member is not applied to the auxiliary appliance and thus, mechanical and electrical connections between the two appliances can be kept stable. Furthermore, in accordance with the present invention, when the auxiliary appliance is removed from the main appliance, the auxiliary appliance is immediately pushed up to the temporary accommodating position enabling removal of the auxiliary appliance and thus, it becomes possible to remove the auxiliary appliance from the main appliance with much ease, whereby a coupling/uncoupling device for use in a combination appliance has been remarkably improved in operational efficiency.

BRIEF DESCRIPTION OF THE DRAWINGS

These and other objects and features of the present invention will become apparent from the following description taken in conjunction with the preferred embodiment thereof with reference to the accompanying drawings, in which;

FIG. 10 is an enlarged front elevational view of a terminal mounting device employed in the radio set of FIG. 1, FIG. 11 is a cross-sectional view taken along the line XI—XI in FIG. 10, FIG. 12 is a cross-sectional view taken along the line XII—XII in FIG. 10, FIG. 13 is an enlarged persective view showing disassembly of the terminal mounting device of FIG. 10.

Before the description of the present invention proceeds, it is to be noted that like parts are designated by like reference numerals throughout several views of the accompanying drawings.

DETAILED DESCRIPTION OF THE INVENTION

Figure 1:
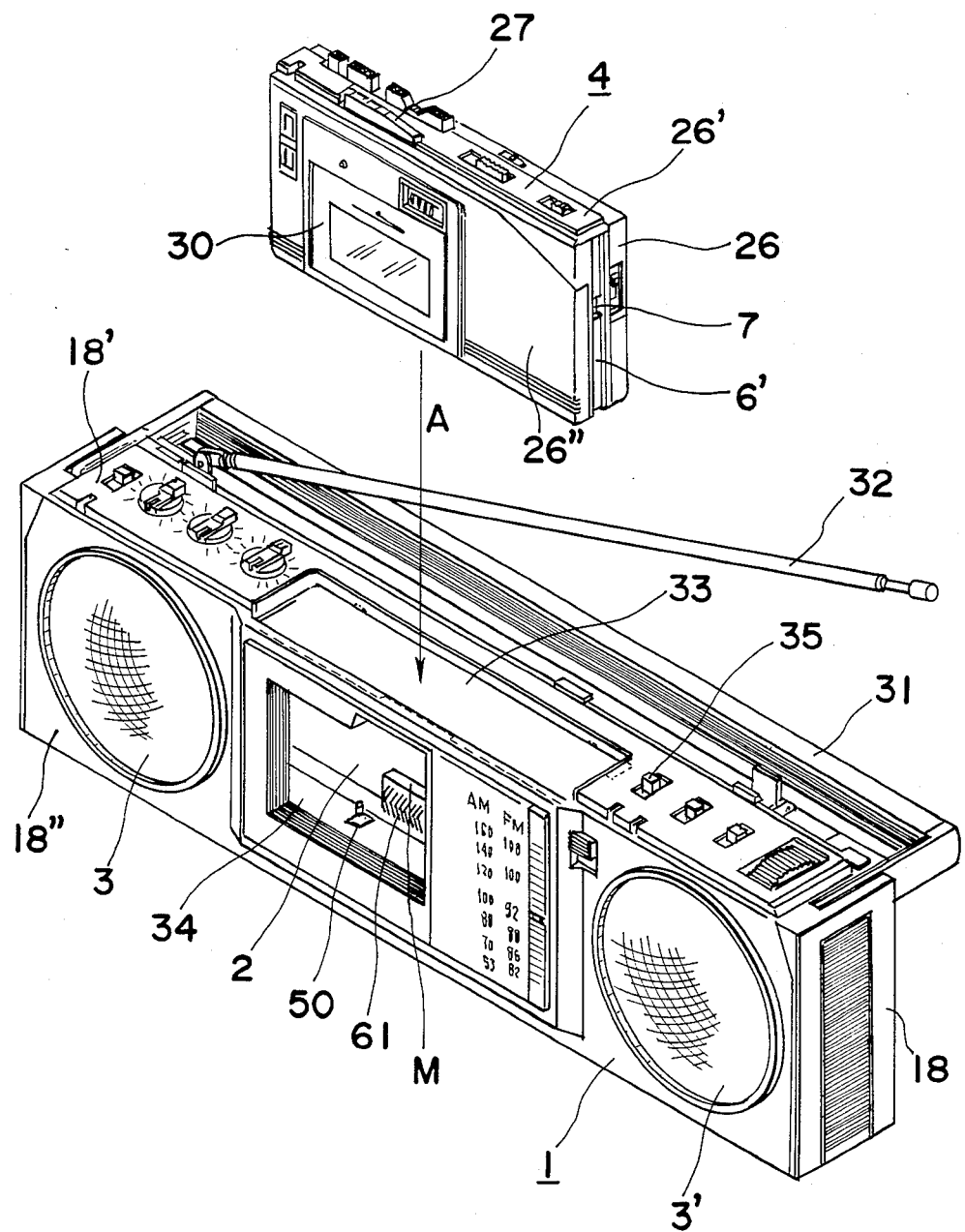
FIG. 1 is a perspective view, at the time of uncoupling, of a radio set equipped with a tape recorder as a combination appliance to which a coupling/uncoupling device according to the present invention may be applied.

Referring now to the drawings, there is shown in FIGS. 1 to 4, a combination audio appliance K arranged to function as a radio set 1 equipped with a tape recorder 4 to which a coupling/uncoupling device according to the present invention may be applied.

The combination audio appliance K, therefore, includes the radio set 1 as a main appliance and the tape recorder 4 as an auxiliary appliance, with the radio set 1 and tape recorder 4 being arranged to be usable independently of each other.

It should be noted that all directional indications such as "top", "front", "rightward", "downwards", etc. are based on illustrations in FIGS. 1 to 4.

Figure 5A:
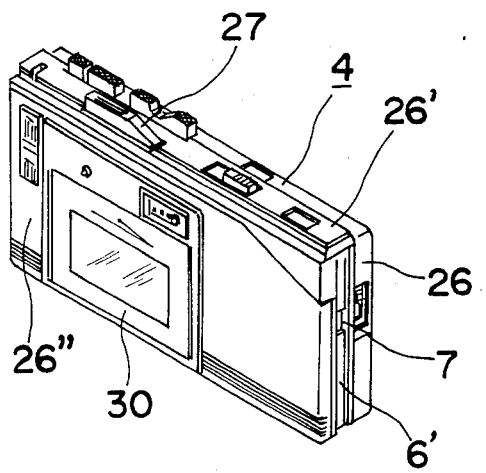
FIGS. 5(a) to 5(d) are perspective views of the tape recorder of FIG. 1, specifically showing the front portion, rear portion, overturned rear portion, and front portion with the cassette cover being directed outwards or ejected, respectively.
Figure 5B:
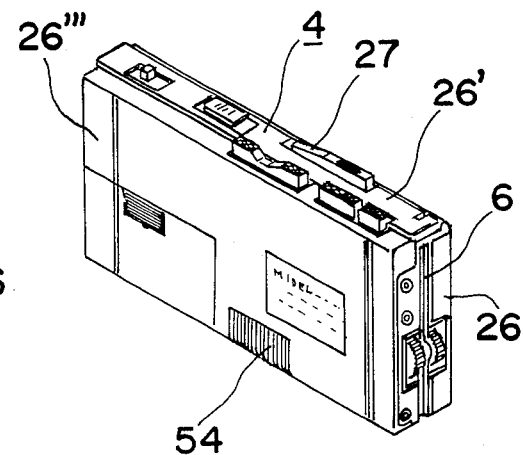
Figure 5C:
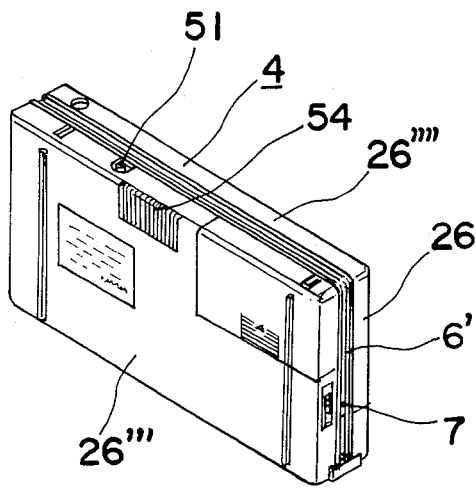
Figure 5D:
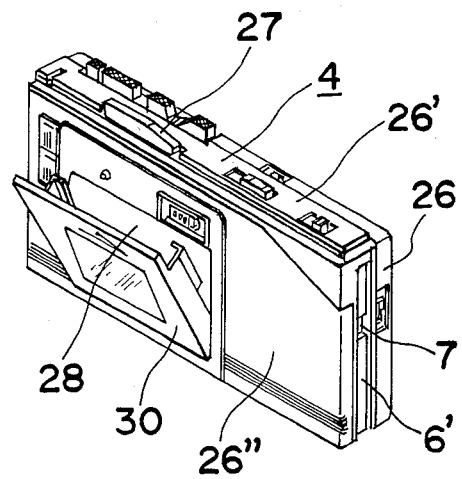

Referring now to FIGS. 5(a) to 5(d), the tape recorder 4 is formed with a tape recorder cabinet 26 including a top wall 26', a front wall 26'', a rear wall 26''' and a bottom wall 26''''. The tape recorder 4 is provided with various push-buttons including a stop/eject button 27 at the top wall 26'. The tape recorder 4 is formed with a cassette loading recess 28 for loading a cessette 29 therein, at the front wall 26'' and with guide grooves 6 and 6' at opposite longitudinal ends of the tape recorder cabinet 26. The cassette loading recess 28 is provided with a cassette cover 30 which is directed outwards or ejected out of the cassette loading recess 28 upon depression of the stop/eject button 27 so as to be disposed slantwise with respect to the front wall 26'' so that a cassette 29 can be loaded into or unloaded from the cassette loading recess 28 as shown in FIG. 5(d). The tape recorder 4 is formed with a locking recess 7 and a plurality of slits 54 on the guide groove 6' and the rear wall 26''', respectively as shown in FIG. 5(c). Furthermore, the tape recorder 4 is provided with a change-over switch 51 on the bottom wall 26'''' as shown in FIG. 5(c).

Referring to FIGS. 1 to 4 and FIGS. 6 to 9, the radio set 1 is formed with a radio cabinet 18 including a top wall 18' and a front wall 18''. The radio set 1 is provided with a handle 31, an extendable antenna 32, and various dials and switches including a radio/tape recorder select switch 35 at the top wall 18'.

The radio set 1 is formed with an accommodation recess 2 for accommodating the tape recorder 4 therein, at a longitudinal center of the top wall 18' and is provided with speakers 3 and 3' which are disposed adjacent to opposite longitudinal ends of the front wall 18'', respectively.

Figure 8:
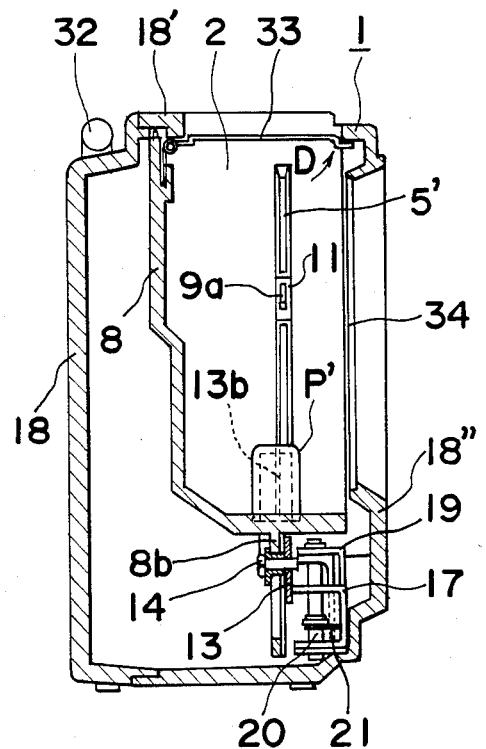
FIG. 8 is a cross-sectional view taken along the line VIII—VIII in FIG. 6.
Figure 9:
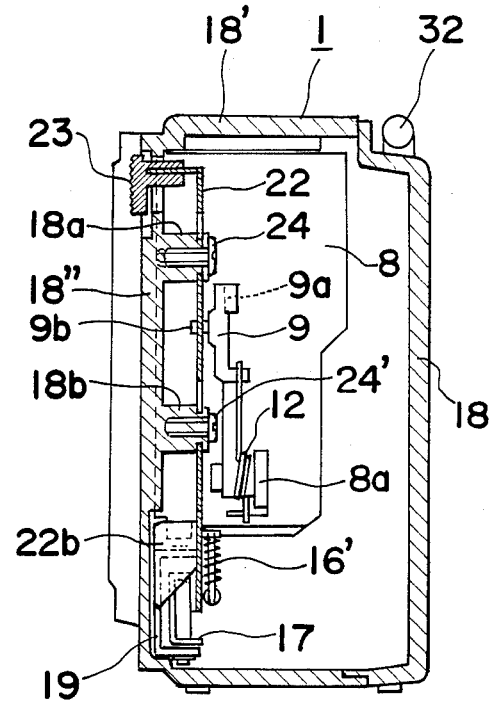
FIG. 9 is a cross-sectional view taken along the line IX—IX in FIG. 6.
Figure 15:
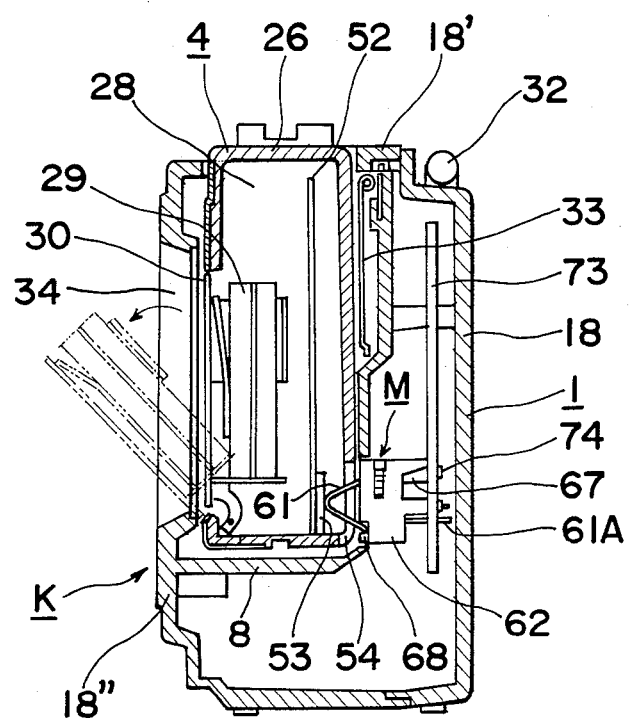
FIG. 15 is a cross-sectional view taken along the line XV—XV in FIG. 14.

The accommodation recess 2 is defined by a frame 8 and the front wall 18'' and is provided with a hinged cover 33 at the top wall 18'. The hinged cover 33 is hinged at a rear wall of the frame 8 and is provided with torsion springs for urging a front end of the hinged cover 33 towards the top wall 18' in a direction indicated by an arrow D so that the front end of the hinged cover 33 may be brought into light contact with the top wall 18' as shown in FIG. 8. Accordingly, it is so arranged that, the hinged cover 33 is biased towards the rear wall of the frame 8 as shown in FIG. 15 and is automatically brought into contact with the top wall 18' as shown in FIG. 8 when the tape recorder 4 is accommodated into the accommodation recess 2 and is taken out of the accommodation recess 2, respectively.

Figure 6:
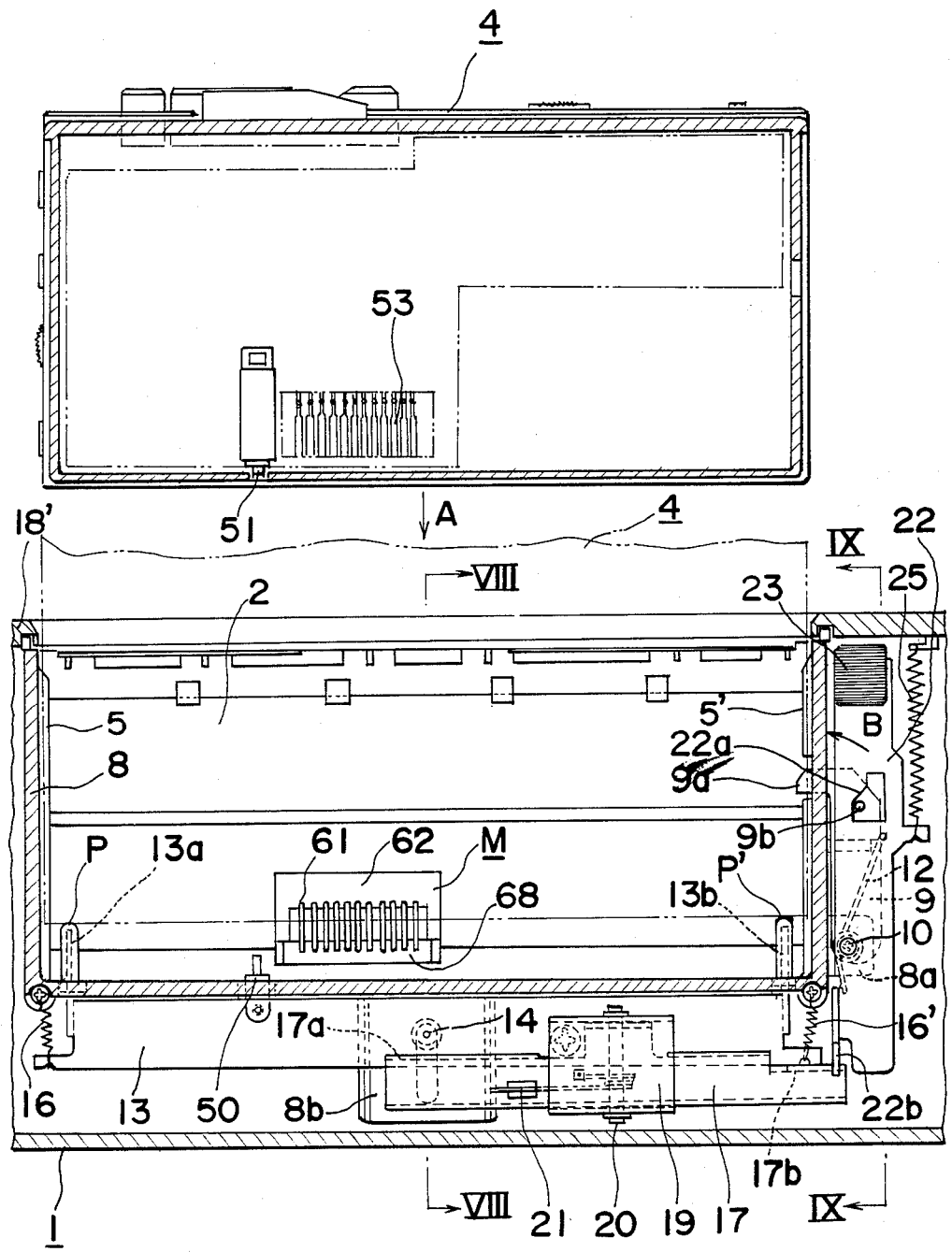
FIG. 6 is a fragmentary elevational view in section showing, on an enlarged scale, the radio set of FIG. 1.

The accommodation recess 2 is further formed with an opening 34 on the front wall 18'' and is provided, at opposite longitudinal ends, with guide rails 5 and 5', respectively extending in a direction A of accommodation of the tape recorder 4 as shown in FIG. 6.

As shown in FIG. 1, the accommodation recess 2 is provided with a spring plate 50 having a pin portion thereon, and a terminal mounting device M at a bottom wall and the rear wall of the frame 8, respectively so that the pin portion of the spring plate 50 and the terminal mounting device M may project into the accommodation recess 2. The spring plate 50 is arranged to be associated with the change-over switch 51 of the tape recorder 4 when the tape recorder 4 has been fully accommodated into the accommodation recess 2 of the radio set 1. The spring plate 50 and the terminal mounting device M will be described in detail later.

It is so arranged that the guide rails 5 and 5' of the radio set 1 are respectively fitted into guide grooves 6 and 6' of the tape recorder 4 so as to guide the tape recorder 4 into the accommodation recess 2 so that the tape recorder 4 may be securely accommodated into the accommodation recess 2 downwards, i.e. in the direction A.

As shown in FIGS. 6 to 9, the frame 8 is formed with a bracket 8a which is disposed at a rightward end and at a lower portion thereof outside the accommodation recess 2. A first locking lever 9 having a locking portion 9a is pivotally supported by a shaft 10 fitted into the bracket 8a and the locking portion 9a is at all times urged pivotally about the shaft 10 in a direction indicated by an arrow B shown in FIG. 6 by a torsion spring 12 so as to project into the accommodation recess 2 through a through-hole 11 formed in the frame 8 and a recess portion of the guide rail 5'.

Accordingly, it is so arranged that, when the tape recorder 4 has been fully accommodated into the accommodation recess 2 downwards, i.e. in the direction A, the locking portion 9a of the first locking lever 9 is fitted into the locking recess 7 of the tape recorder 4 so as to lock the tape recorder 4 at an accommodating position thereof.

Furthermore, a supporting lever 13 having supporting portions 13a and 13b at opposite longitudinal ends is provided below a bottom wall of the frame 8 and is supported pivotally and slidably upwards and downwards by a shaft 14 fitted into a lower end portion 8b of the frame 8. The supporting member 13 is urged at all times upwards, i.e., in a direction opposite to the direction A by springs 16 and 16' so that the supporting portions 13a and 13b may project into the accommodation recess 2 through through-holes 15 and 15' formed on the bottom wall of the frame 8, respectively.

When the tape recorder 4 is initially accommodated into the accommodation recess 2 so deeply as to come into contact with the supporting portions 13a and 13b, the tape recorder 4 is held temporarily at a temporary accommodating position thereof by an urging force of the springs 16 and 16' so that a part of the tape recorder 4 may project out of the accommodation recess 2 upwards as shown by imaginary lines in FIG. 6. When the tape recorder 4 is further accommodated into the accommodation recess 2, with a force greater than the upward urging force of the springs 16 and 16' being applied to the tape recorder 4 downwards, the supporting portions 13a and 13b are downwardly ejected out of the accommodation recess 2 so as to be moved to an ejecting position thereof. Meanwhile, it is to be noted that the supporting portions 13a and 13b are capped with plastic covers P and P', respectively so as to avoid damage to the tape recorder cabinet 26.

Figure 7:
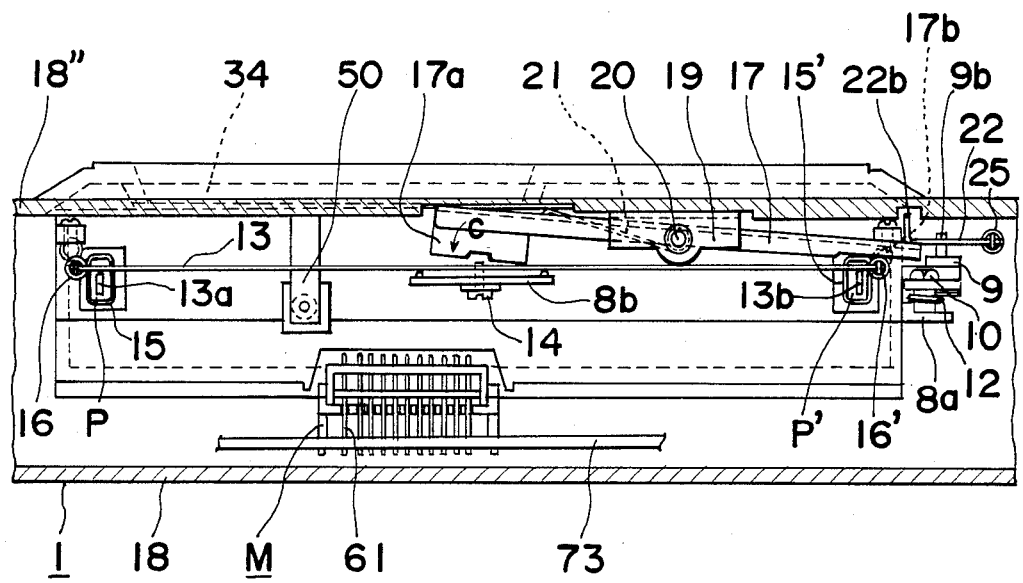
FIG. 7 is a fragmentary bottom plan view in section showing, on an enlarged scale, the radio set of FIG. 1.

Moreover, a second locking lever 17 having an engaging portion 17a, for locking the supporting member 13 at the ejecting position of the supporting portions 13a and 13b, is provided below the bottom wall of the frame 8 and adjacent to the supporting lever 13, and is pivotally supported by a shaft 20 fitted into a U-shaped bracket 19 which is attached to the front wall 18'' inside the accommodation recess 2 so as to urge the engaging portion 17a pivotally about the shaft 20 in a direction indicated by an arrow C by a torsion spring 21 so that the engaging portion 17a may be brought into contact with the supporting lever 13 at all times as shown in FIG. 7.

Furthermore, a lock releasing lever 22 provided with a lock releasing button 23 at an upper portion thereof is provided adjacent to the bracket 8a and the front wall 18'' outside the accommodation recess 2 so that the lock releasing button 23 may project out of the front wall 18'' through a through-opening formed on the front wall 18''. The lock releasing lever 22 is attached to bosses 18a and 18b inside the front wall 18'' slidably upwards and downwards by set-screws 24 and 24', respectively and is urged at all times upwards, i.e. in the direction opposite to the direction A by a tension spring 25 as shown in FIGS. 6 and 7. The lock releasing lever 22 is formed with a first cam portion 22a approximately at a central portion thereof and a second cam portion 22b at a lower portion thereof. It is so arranged that, when the lock releasing button 23 is slidably moved downwards, i.e. in the direction A, the first cam portion 22a in contact with a pin 9b driven into the first locking lever 9 causes the first locking lever 9 to pivot in a direction opposite to the direction B against an urging force of the torsion spring 12, and the second cam portion 22b in contact with a releasing portion 17b of the second locking lever 17 causes the second locking lever 17 to pivot in a direction opposite to the direction C against an urging force of the torsion spring 21.

Then, electrical connections between the radio set 1 and the tape recorder 4 will be described hereinbelow. As shown in FIGS. 5(c), 6 and 15, a plurality of connecting conductive patterns 53 corresponding to a plurality of the slits 54 formed on the rear wall 26''' of the tape recorder cabinet 26 are provided on a printed circuit board 52 which is disposed inside the tape recorder cabinet 26. Meanwhile, as shown in FIG. 1, the terminal mounting device M is provided on the rear wall of the frame 8 so as to project into the accommodation recess 2 of the radio set 1 as described earlier. It is so arranged that the terminal mounting device M is electrically connected with the connecting conductive patterns 53 through the slits 54 when the tape recorder 4 has been fully accommodated into the accommodation recess 2 of the radio set 1.

Hereinbelow, the terminal mounting device M will be described in detail. Referring to FIGS. 10 to 13, the terminal mounting device M comprises a main body 62, a support member 68, and a plurality of elastic connecting wire members 61 equal in number to the number of slits 54 of the tape recorder 4. The elastic connecting wire member 61 has a rectilinear terminal portion 61A, and a V-shaped bent portion 61B including a contact bent portion $61b_1$ and an elastic bent portion $61b_2$. A first intermediate portion 61bb and a second intermediate portion 61 Ab are formed between the contact bent portion $61b_1$, and the elastic bent portion $61b_2$, and between the elastic bent portion $61b_2$ and the terminal portion 61A, respectively.

Meanwhile, the main body 62 is formed with a front plate portion 62' and a rear plate portion 62''. An accommodation recess 63 for accommodating the bent portions $61b_2$ of the elastic connnecting wire members 61 therein is formed between the front plate portion 62' and the rear plate portion 62''. The front plate portion 62' has a recessed portion 63a at an opening portion of the accommodation recess 63 and the recessed portion 63a is further formed with a plurality of support grooves 64 each receiving the first intermediate portion 61bb while the rear plate portion 62'' is formed with a plurality of guide grooves 65 each receiving the terminal portion 61A. Furthermore, the main body 62 is integrally formed, on the rear plate portion 62'', with mounting base portions 66a, 66b, 66c and 66d and a mounting boss 67 for attaching the terminal mounting device M to a printed circuit board 73 provided in the radio cabinet 18 as shown in FIG. 15, which extend in a backward direction of the main body 62. A support member 68 is fitted into the accommodation recess 63 of the main body 62 and has a plate portion 69 for holding the second intermediate portion 61Ab down to the rear plate portion 62'' of the main body 62. The support member 68 is further formed with a plurality of support grooves 70 each receiving a free end portion $61b_1'$ of the contact bent portion $61b_1$. The support member 68 has elastic locking portions 72a and 72b formed at opposite longitudinal ends of the plate portion 69, respectively while the main body 62 is formed with locking grooves 71a and 71b at opposite longitudinal ends thereof, respectively. It is so arranged that, when the support member 68 has been fully accommodated into the accommodation recess 63 of the main body 62, the elastic locking portions 72a and 72b are fitted into the locking grooves 71a and 71b, respectively so that the support member 68 may be fixedly held in the main body 62. Accordingly, when the elastic connecting wire members 61 have been fitted into the accommodation recess 63 of the main body 62 through the support grooves 64 and the guide grooves 65 so that the contact bent portions $61b_1$ may project out of the front plate portion 62' through the support grooves 64 with the terminal portions 61A projecting out of the rear plate portion 62'' through the guide grooves 65, the plate portion 69 of the support member 68 is fitted into the accommodation recess 63, so that the elastic connecting wire members 61 are mounted on the main body 62 accurately.

Meanwhile, as shown in FIG. 13, the guide grooves 65 of a long depth and those of a short depth are arranged alternately. Accordingly, it is so arranged that the elastic connecting wire members 61 having the second intermediate portion 61Ab of length l1 and l2 (l1<l2) are fitted into guide grooves 65 of a long depth and a short depth, respectively and thus, the terminal portions 61A project out of the rear plate portion 62'' of the main body 62 so as to be displaced from the adjacent terminal portions 61A in the direction of the guide grooves 65, whereby it becomes possible to increase the number of the elastic connecting wire members 61 without making the main body 62 larger in size and the printed circuit board 73 requires only a small area for mounting the main body 62 thereon.

As shown in FIG. 15, the terminal mounting device M is attached to the printed circuit board 73 with screws 74 so that the V-shaped bent portions 61B may project into the accommodation recess 2. It should be noted that, when the tape recorder 4 is accommodated into the accommodation recess 2 of the radio set 1, the V-shaped bent portions 61B are slidably brought into contact with the connecting conductive patterns 53 through the slits 54 at all times, so that corresponding contact portions of the V-shaped bent portions 61B and the connecting conductive patterns 53 are subjected to cleaning, thereby producing a remarkable effect for prevention against corrosion, dust, etc.

The coupling/uncoupling device of the present invention is arranged as described above, and operations thereof will be described in the order of accommodation of the tape recorder 4 into and its removal from the accommodation recess 2 of the radio set 1, hereinbelow.

Figure 2:
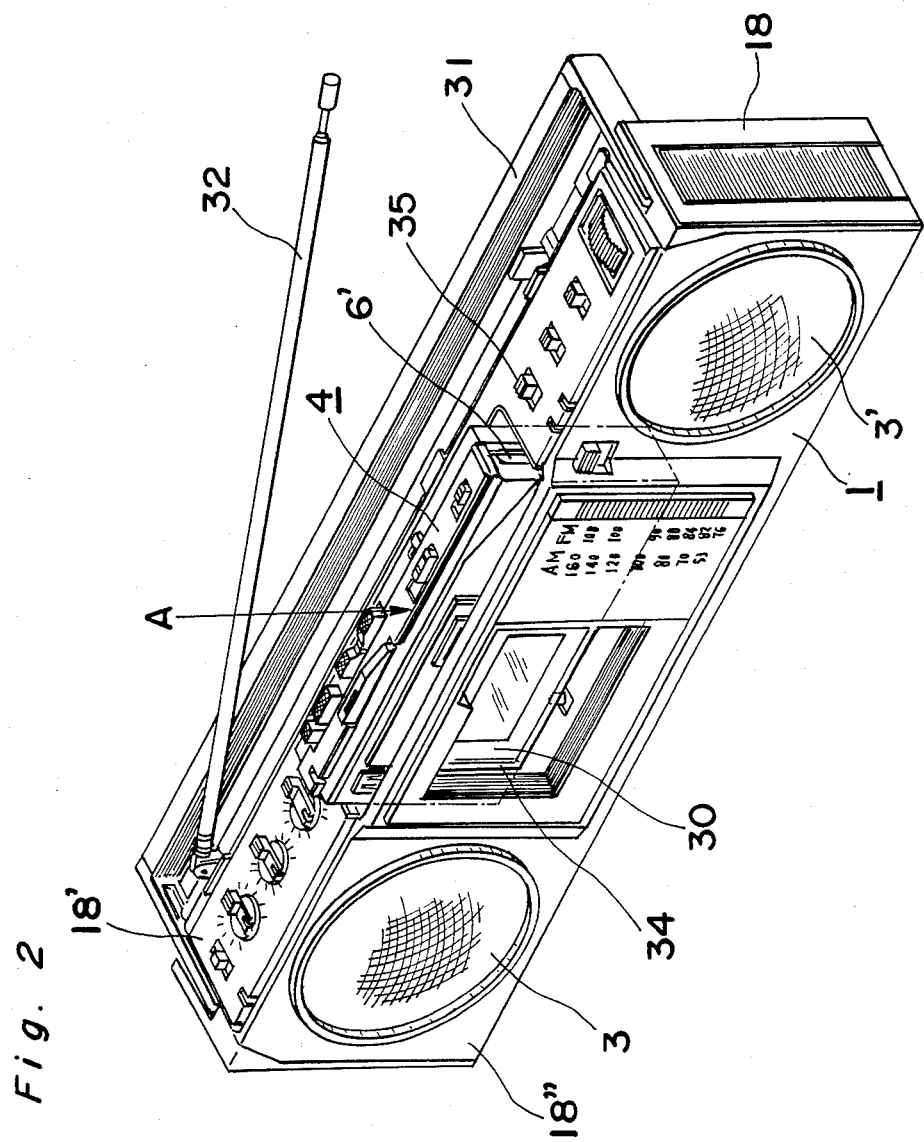
FIG. 2 is a perspective view showing the tape recorder of FIG. 1 accommodated in the radio set of FIG. 1 so as to be held at a temporary accommodation position thereof.
Figure 14:
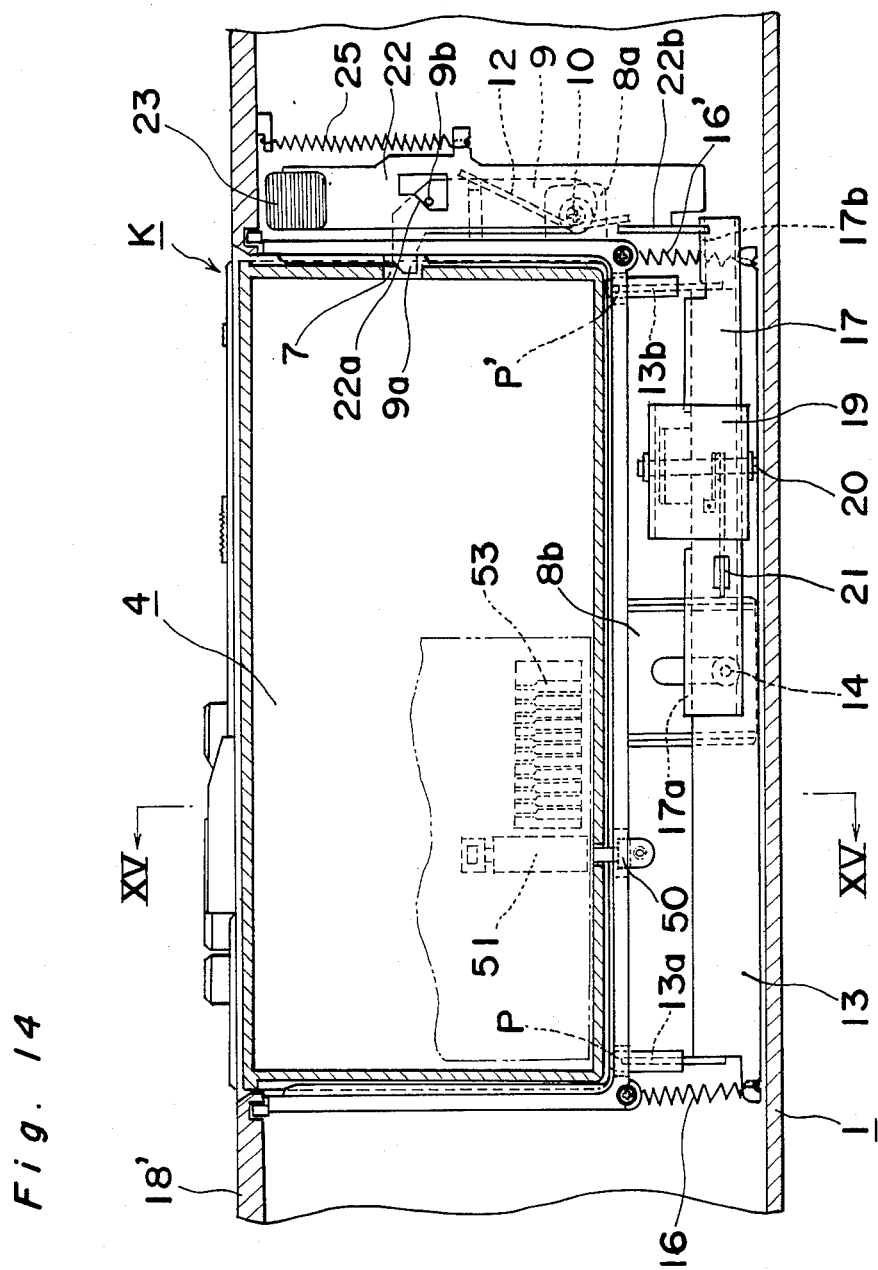
FIG. 14 is a fragmentary front elevational view in section showing, on an enlarged scale, the tape recorder of FIG. 1, fully accommodated in the radio set of FIG. 1.

Firstly, in the case where the tape recorder 4 is accommodated into the accommodation recess 2 of the radio set 1 from a state shown in FIG. 1, the hinged cover 33 is depressed so as to be biased towards the rear wall of the frame 8 and the tape recorder 4 is guided into the accommodation recess 2 downwards, i.e., in the direction A by the guide grooves 6 and 6' in association with the guide rails 5 and 5', respectively until the tape recorder 4 is temporarily held at the temporary accommodating position with a part of the tape recorder 4 projecting out of the accommodation recess 2 upwards as shown in FIG. 2, when the bottom wall 26'''' of the tape recorder cabinet 26 is in contact with the supporting portions 13a and 13b of the supporting member 13 as shown by the imaginary lines in FIG. 6. It should be noted that the locking portion 9a of the first locking lever 9 is pivotally biased by the guide groove 6' in the direction opposite to the direction B against the urging force of the torsion spring 12 at this moment. When the tape recorder 4 is further accommodated into the accommodation recess 2, downwards with a force greater than the upward urging force of the springs 16 and 16' of the supporting member 13 being applied to the tape recorder 4 downwards, the supporting lever 13 is moved downwards to the ejecting position so that the supporting portions 13a and 13b may be downwardly ejected out of the accommodating recess 2 and then, the engaging portion 17a which has been in contact with the supporting lever 13 is disengaged from the supporting lever 13 as shown in FIG. 14, so that the second locking lever 17 is caused to pivot in the direction C by the urging force of the torsion spring 21, whereby the engaging portion 17a is moved into a path of the supporting lever 13 so as to lock the supporting lever 13 at the ejecting position against the upward urging force of the springs 16 and 16'. Meanwhile, it is so arranged that, when the tape recorder 4 is brought to the accommodating position so that the supporting lever 13 may reach the ejecting position, the locking recess 7 of the tape recorder 4 confronts the locking portion 9a of the first locking lever 9 and thus, the locking portion 9a which has been pivotally biased by the guide groove 6' of the tape recorder 4 in the direction opposite to the direction B against the urging force of the torsion spring 12 is pivotally moved in the direction B by the urging force of the torsion spring 12 so as to be fitted into the locking recess 7 so that the tape recorder 4 may be locked at the accommodating position.

Accordingly, in accordance with the present invention, when the tape recorder 4 has been fully accommodated into the accommodation recess 2 of the radio set 1 so as to reach the accommodation position, the tape recorder 4 and the supporting lever 13 are locked simultaneously at the locking position and the ejecting position, respectively, so that the undesirable urging force of the springs 16 and 16' is not applied to the tape recorder 4, whereby mechanical and electrical couplings between the radio set 1 and the tape recorder 4 can be kept stable.

Figure 3:
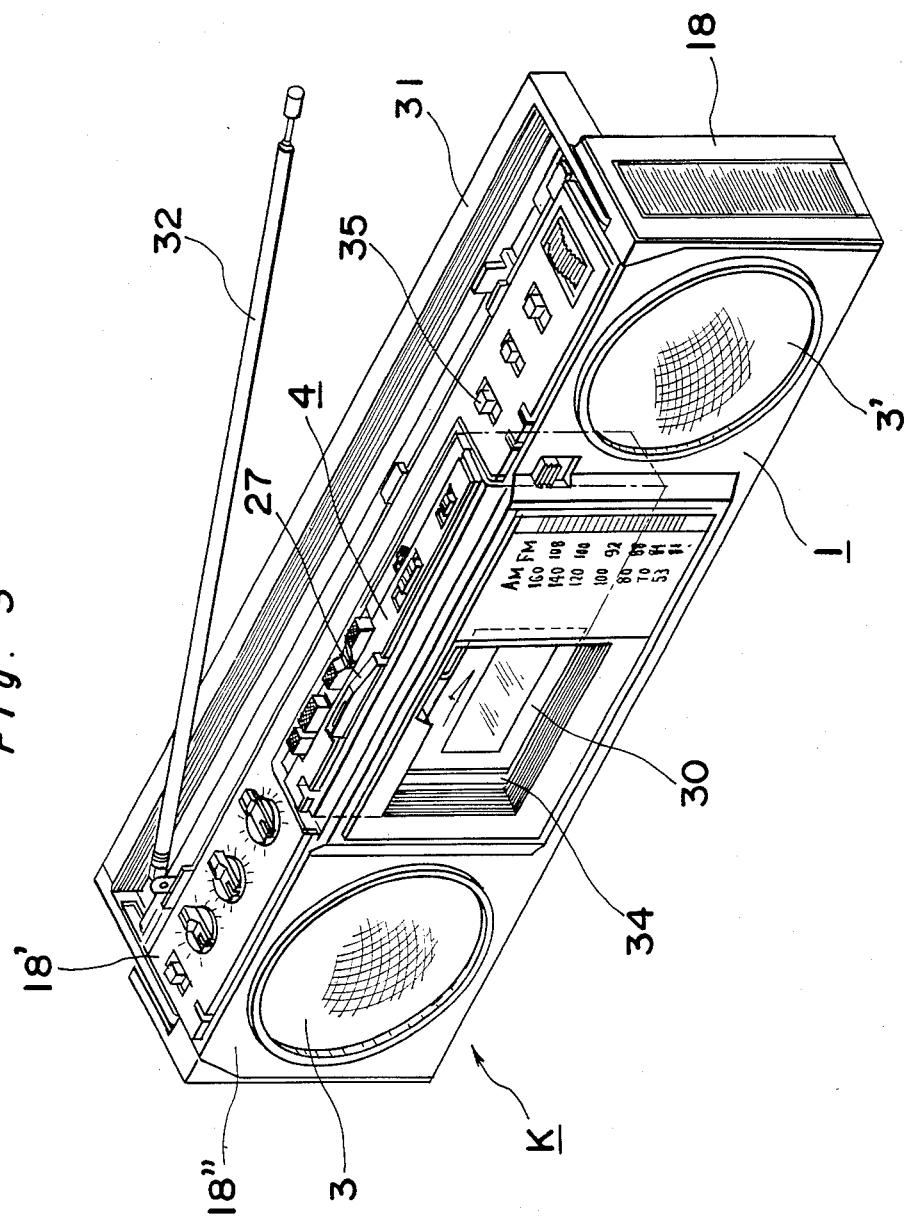
FIG. 3 is a perspective view showing the tape recorder of FIG. 1 fully accommodated in the radio set of FIG. 1.
Figure 4:
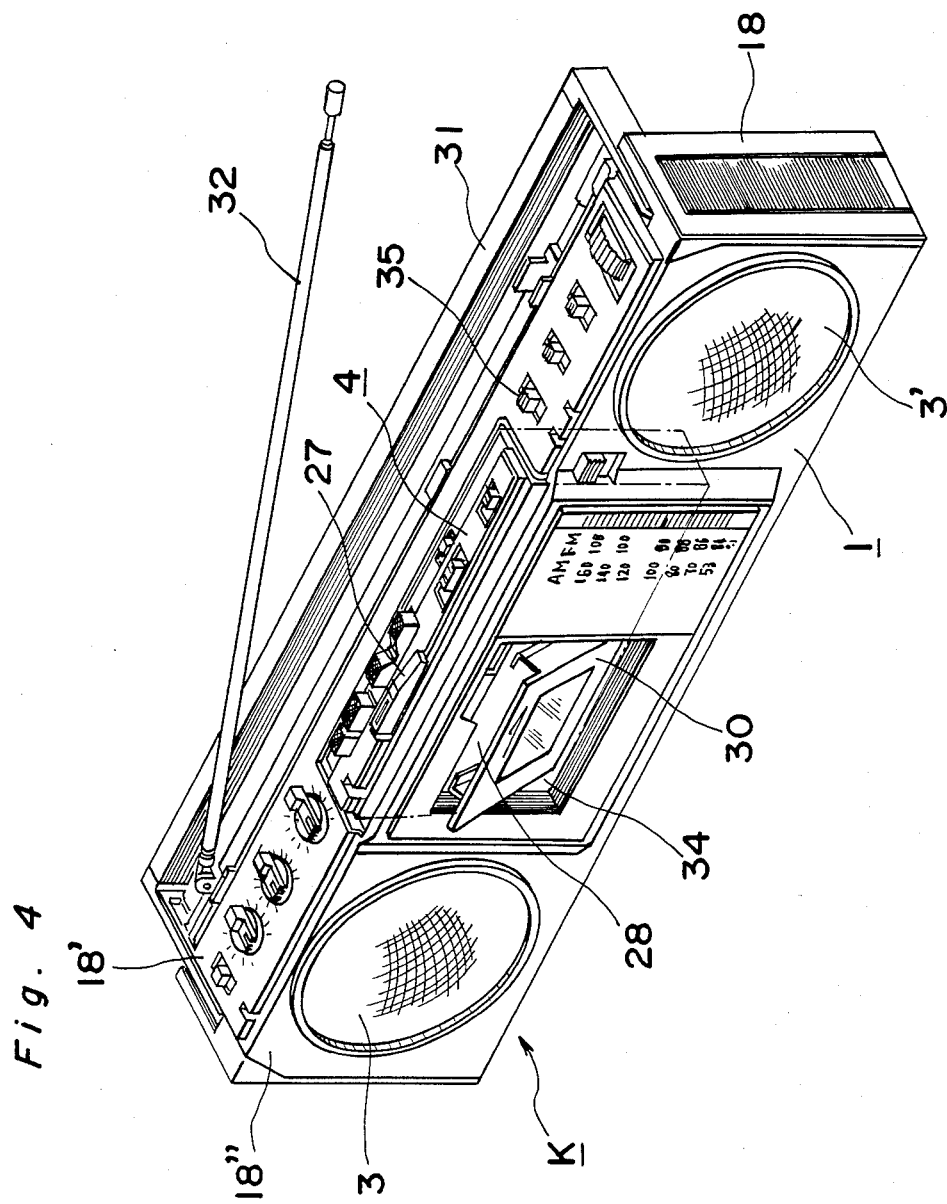
FIG. 4 is a view similar to FIG. 3, particularly showing a cassette cover of the tape recorder being directed outwards or ejected.

It is to be noted that, when the tape recorder 4 has been fully accommodated into the accommodation recess 2, various push-buttons of the tape recorder 4 project out of the top wall 18' of the radio cabinet 18 so as to enable their depression as shown in FIG. 3, so that, for example the cassette cover 30 can be ejected out of the front wall 18" of the radio cabinet 18 through the opening 34 by depressing the stop/eject button 27 as shown in FIGS. 4 and 15 and thus, the cassette 29 can be loaded into or unloaded from the cassette loading recess 28.

It also should be noted that, when the tape recorder 4 has been fully accommodated into the accommodation recess 2, the change-over switch 51 of the tape recorder 4 is pushed upwards by the pin portion of the spring plate 50 so as to be actuated so that power source of the tape recorder 4 may be changed over to that of the radio set 1, while the connecting conductive patterns 53 on the printed circuit board 52 in the tape recorder cabinet 26 are brought into contact with the corresponding contact bent portions 61b₁ of the elastic connecting wire members 61 of the radio set 1 through the slits 54 formed on the rear wall 26''' of the tape recorder cabinet 26 so that the tape recorder 4 may be electrically connected with the radio set 1.

On the other hand, in the case where the tape recorder 4 is taken out of the accommodation recess 2 of the radio set 1, the lock releasing button 23 is moved downwards, i.e. in the direction A so as to slidably move the lock releasing member 22 downwards, so that the first cam portion 22a in contact with the pin 9b of the first locking lever 9 causes the first locking lever 9 to pivot in the direction opposite to the direction B against the urging force of the torsion spring 12, and the second cam portion 22b in contact with the releasing portion 17b of the second locking lever 17 causes the second locking lever 17 to pivot in the direction opposite to the direction C against the urging force of the torsion spring 21.

Consequently, since the locking of the tape recorder 4 at the accommodating position through the locking portion 9a of the first locking lever 9 and that of the supporting lever 13 at the ejecting position through the engaging portion 17a of the second locking lever 17 are released simultaneously, the supporting lever 13 is slidably moved upwards, i.e. in the direction opposite to the direction A by the urging force of the springs 16 and 16' so that the tape recorder 4 may be pushed up to the temporary accommodating position by the supporting portions 13a and 13b of the supporting lever 13 as shown in FIG. 2, whereby the tape recorder 4 can be taken out of the accommodation recess 2 of the radio set 1.

Accordingly, in accordance with the present invention, in the case where the tape recorder 4 is taken out of the radio set 1, the locking of the tape recorder 4 at the accommodating position and that of the supporting lever 13 at the ejecting position are released simultaneously through operation of the lock releasing button 23, so that the tape recorder 4 is immediately pushed up to the temporary accommodating position enabling removal of the tape recorder 4 and thus, it becomes possible to remove the tape recorder 4 from the radio set 1 with much ease.

It should be noted that, when the tape recorder 4 has been taken out of the accommodation recess 2 of the radio set 1, the change-over switch 51 of the tape recorder 4 is disengaged from the pin portion of the spring plate 50 of the radio set 1, so that the change-over switch 51 is automatically returned to its original position and thus, the tape recorder 4 is operated by the power source of its own independently of the power source of the radio set 1, while the connecting conductive patterns 53 of the tape recorder 4 is disengaged from the corresponding contact bent portions 61b₁ of the elastic connecting wire members 61 of the radio set 1, so that the tape recorder 4 is electrically disconnected from the radio set 1.

Figure 16:
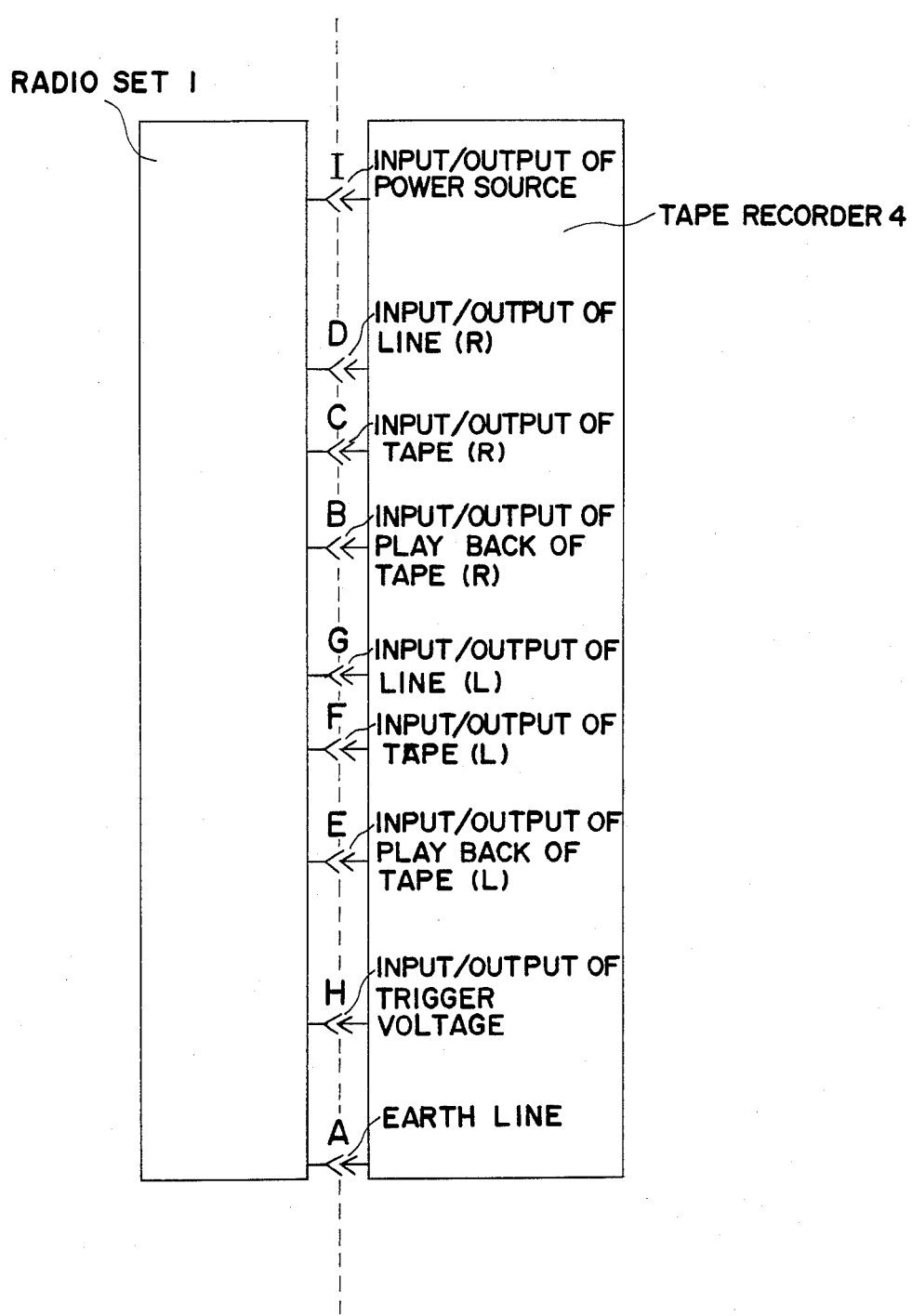
FIG. 16 is an electrical block diagram showing electrical connections between the radio set of FIG. 1 and the tape recorder of FIG. 1.

Hereinbelow, electrical connections between the tape recorder 4 and the radio set 1 will be described briefly with reference to electrical block diagrams of FIGS. 16 to 18. It is to be noted that the connecting conductive patterns 53 of the tape recorder 4 to be engaged with the elastic connecting wire members 61 of the radio set 1 form a contact A for earth line, a contact B for input-/output of play back of tape (R), a contact C for input-/output of tape (R), a contact D for input/output of line (R), a contact E for input/output of play back of tape (L), a contact F for input/output of tape (L), a contact G for input/output of line (L), a contact H for input-/output of trigger voltage and a contact I for input/output of power source, between the tape recorder 4 and the radio set 1 as shown in FIG. 16. Thus, the tape recorder 4 is electrically connected with the radio set 1 through the contacts A to I when the tape recorder 4 has been accommodated into the accommodation recess 2 of the radio set 1. When the tape recorder 4 has been fully accommodated into the accommodation recess 2 of the radio set 1, the change-over switch 51 of the tape recorder 4 is actuated by the spring plate 50, so that switches S701, S702, and S801 of the tape recorder 4 are changed over to "IN", whereby the power source of the tape recorder 4 is changed over to that of the radio set 1. Meanwhile, the tape recorder 4 is electrically connected with the radio set 1 through engagement of the connecting conductive patterns 53 by the corresponding contact bent portions 61$b_1$ of the elastic connecting wire members 61 of the radio set 1, whereby the contacts A to I are connected between the tape recorder 4 and the radio set 1. It should be noted that the circuit arrangements for the contacts B, C and D are the same as those of the contacts E, F and G, respectively, and therefore, are not illustrated in FIGS. 17 and 18 for brevity.

Figure 17:
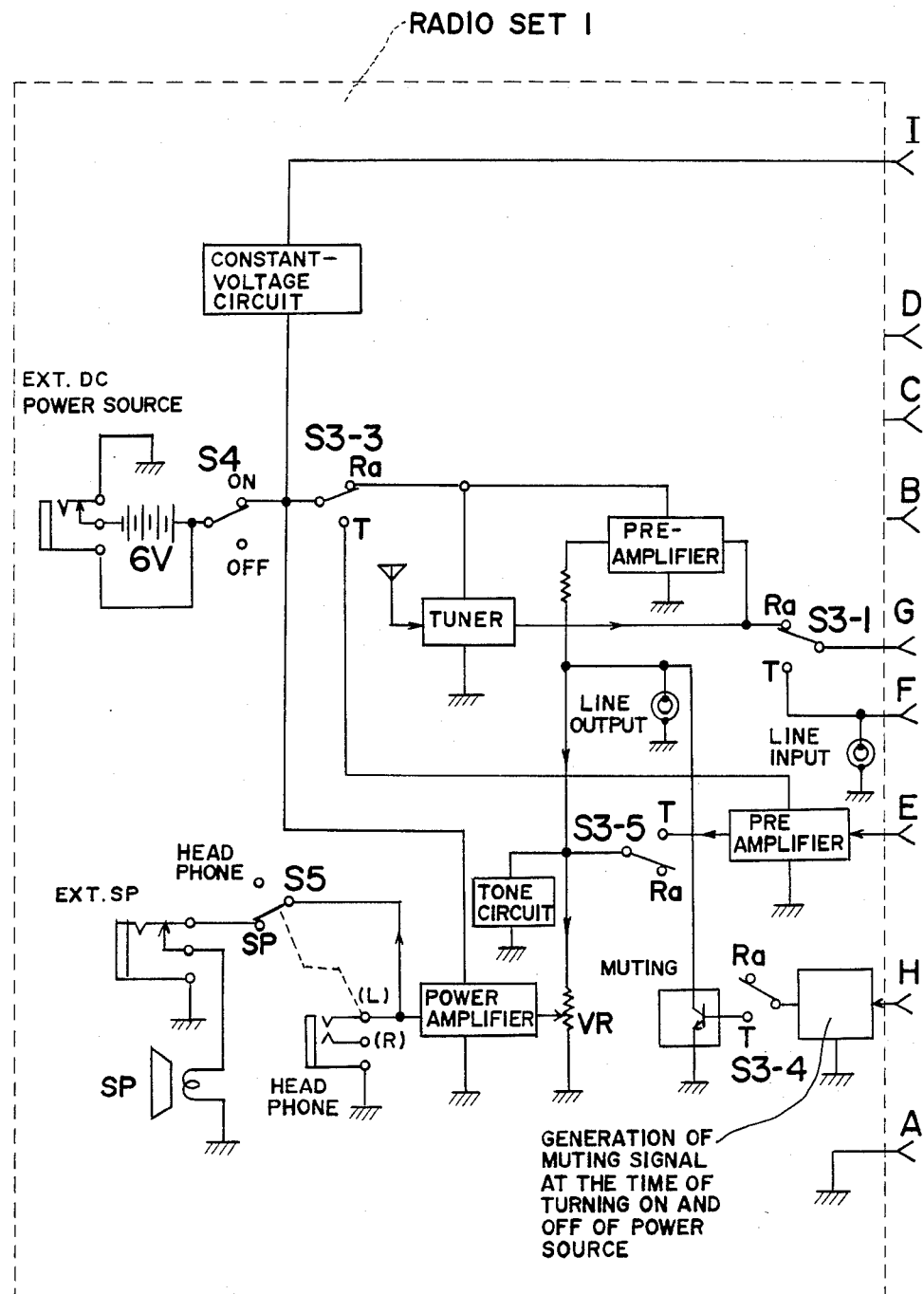
FIG. 17 is an electrical block diagram showing the circuit construction of the radio set of FIG. 1.

In the case where signals received by the radio set 1 are recorded by the tape recorder 4 fully accommodated into the accommodation recess 2 of the radio set 1, the radio/tape recorder select switch 35 of the radio set 1 is manually set to "radio", so that switches S3-1, S3-3, S3-4, and S3-5 are set to "radio" as shown in FIG. 17.

Meanwhile, in the case where signals recorded by the tape recorder 4 which is fully accommodated into the accommodation recess 2 of the radio set 1 are played back by the radio set 1, the radio/tape recorder select switch 35 of the radio set 1 is manually set to "tape recorder", so that switches S3-1, S3-3, S3-4, and S3-5 are set to "tape recorder".

Figure 18:
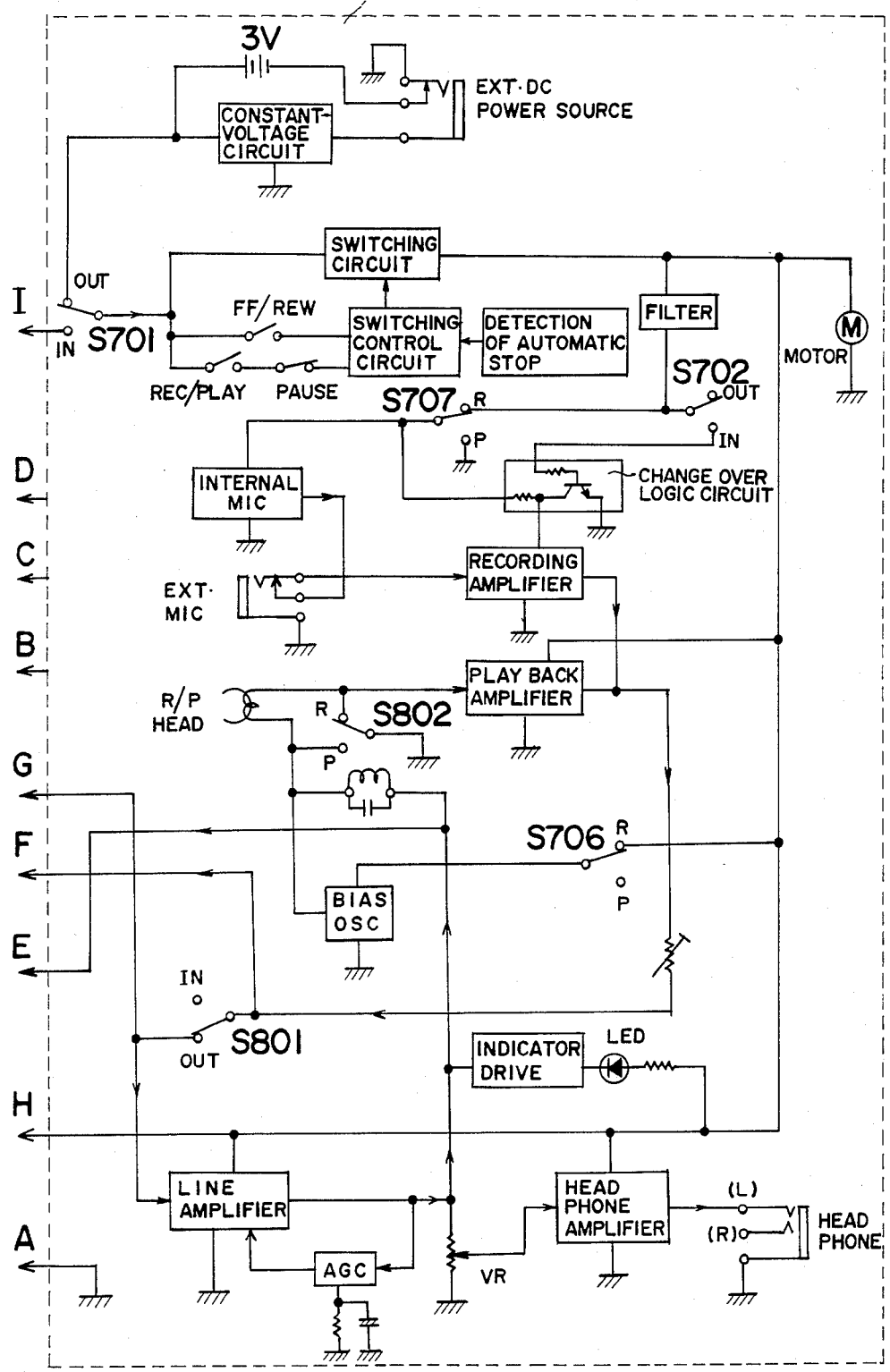
FIG. 18 is an electrical block diagram showing the circuit construction of the tape recorder of FIG. 1.

In the case where the tape recorder 4 is operated independently of the radio set 1, the changeover switch 51 of the tape recorder 4 is automatically returned to its original position upon its disengagement from the pin portion of the spring plate 50 as described above, so that the switches S701, S702 and S801 are changed over to "OUT" as shown in FIG. 18.

Meanwhile, in the case where the radio set 1 is operated independently of the tape recorder 4, the radio/tape recorder select switch 35 of the radio set 1 is manually set to "radio", so that the switches S3-1, S3-3, S3-4, and S3-5 are set to "radio".

It is to be noted that a switch S4 acts as a power source switch of the radio set 1 while a record/play back switch and a fast forward/rewind switch act as power source switches of the tape recorder 4.

It also should be noted that switches S706, S707, S802 act as record/play back select switches of the tape recorder 4.

Meanwhile, although in this embodiment a radio set and a tape recorder have been described as a main appliance and an auxiliary one, respectively, it is likewise possible to provide a reverse arrangement in which the radio set and tape recorder act as an auxiliary appliance and a main one, respectively.

As is clear from the foregoing description, in a coupling/uncoupling device of the present invention for use in a combination appliance including a main appliance combined with an auxiliary appliance with the main and auxiliary appliances being arranged to be usable independently of each other, it is so arranged that, when the auxiliary appliance is initially accommodated into an accommodation recess formed in the main appliance, the auxiliary appliance is brought into contact with supporting portions of a supporting member so as to be held at a temporary accommodating position thereof by the supporting portions through an urging force of urging means of the supporting member so that a part of the auxiliary appliance may project out of the accommodation recess in a direction opposite to that of accommodation of the auxiliary appliance with the urging force being applied in the direction opposite to that of accommodation of the auxiliary appliance. Furthermore, it is so arranged that, when the auxiliary appliance is further acccommodated into the accommodation recess fully to reach an accommodating position thereof with a force greater than the urging force of the urging means being applied to the auxiliary appliance in the direction of accommodation of the auxiliary appliance, the supporting portions are ejected out of the accommodation recess in the direction of accommodation of the auxiliary appliance so as to reach an ejecting position thereof, so that the auxiliary appliance and supporting member are locked simultaneously at the accommodating position and at the ejecting position against the urging force of the urging means, respectively.

Accordingly, in accordance with the present invention, when the main appliance has been combined with the auxiliary appliance, the undesirable urging force of the supporting member is not applied to the auxiliary appliance, so that mechanical and electrical connections between the two appliances can be kept stable. Furthermore, in accordance with the present invention, in the case where the auxiliary appliance is removed from the main appliance, the locking of the auxiliary appliance at the accommodating position and that of the supporting member at the ejecting position are released simultaneously, so that the auxiliary appliance is immediately pushed up to the temporary accommodating position enabling the removal of the auxiliary appliance and thus, it becomes possible to remove the auxiliary appliance from the main appliance with much ease.

Thus, the present invention provides an improved coupling/uncoupling device for use in a combination appliance, which is remarkably excellent in operational efficiency and reliable in actual use.

Although the present invention has fully been described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A coupling/uncoupling device for use in a combination appliance including a main appliance combined with an auxiliary appliance, with said main appliance and said auxiliary appliance being arranged to be usable independently of each other, comprising:

an accommodation recess for accommodating said auxiliary appliance therein, which is formed in said main appliance;

a first locking member having a locking portion which is projected into said accommodation recess so as to lock said auxiliary appliance at an accommodating position thereof when said auxiliary appliance has been fully accommodated into said accommodation recess;

a supporting member having supporting portions which are urged at all times by urging means in a direction opposite to that of accommodation of said auxiliary appliance so as to project into said accommodation recess;

said supporting portions being arranged to hold said auxiliary appliance temporarily at a temporary accommodating position thereof through an urging force of said urging means so that a part of said auxiliary appliance may project out of said accommodation recess in the direction opposite to that of accommodation of said auxiliary appliance when said auxiliary appliance is initially accommodated into said accommodation recess so deeply as to come into contact with said supporting portions and, being arranged to be ejected out of said accommodation recess in the direction of accommodation of said auxiliary appliance so as to be moved to an ejecting position thereof when said auxiliary appliance is further accommodated into said accommodation recess so as to reach said accommodating position, with a force greater than the urging force of said urging means being applied to said auxiliary appliance in the direction of accommodation of said auxiliary appliance;

a second locking member for locking said supporting member at the ejecting position of said supporting portions; and a lock releasing member associated with a lock releasing button, which actuates said first locking member and said second locking member so as to release locking of said auxiliary appliance at the accommodating position and locking of said supporting member at the ejecting position, respectively when said lock releasing button is operated;

all of said first locking member, said supporting member, said second locking member and said lock releasing member being provided in said main appliance;

whereby said auxiliary appliance is locked at the accommodating position by said first locking member and said supporting member is locked at the ejecting position by said second locking member when said auxiliary appliance has been fully accommodated into said accommodation recess so as to reach the accommodating position; and the locking of said auxiliary appliance through said first locking member and the locking of said supporting member through said second locking member are released simultaneously by said lock releasing member so as to push said auxiliary appliance up to the temporary accommodating position in the direction opposite to that of accommodation of said auxiliary appliance by said supporting member through the urging force of said urging means when said lock releasing button is operated.

2. A coupling/uncoupling device as claimed in claim 1, wherein said main appliance is either one of a radio set and a tape recorder and said auxiliary appliance is the other one of said radio set and said tape recorder.

3. A coupling/uncoupling device as claimed in claim 1 or claim 2, wherein said main appliance is further provided with guide rails in said accommodating recess and said auxiliary appliance is formed with guide grooves one of which is provided with a locking recess for receiving said locking portion of said first locking member when said auxiliary appliance is locked at the accommodating position, said guide rails being arranged to be fitted into guide grooves, respectively so as to guide said auxiliary appliance into said accommodation recess so that said auxiliary appliance may be securely accommodated into said accommodation recess.

4. A coupling/uncoupling device as claimed in claim 3, wherein said first locking member and said second locking member are further provided with a first urging means and a second urging means, respectively, said first urging means urging said first locking means at all times so that said locking portion of said first locking member may be fitted into said locking recess in said guide grooves of said auxiliary appliance when said auxiliary appliance is locked at the accommodating position, said second urging means urging said second locking means at all times so that said second locking member may be brought into contact with said supporting member until said supporting portions are moved to the ejecting position, when said second locking means is disengaged from said supporting member so as to be moved into a path of said supporting member so that said supporting member may be locked.

5. A coupling/uncoupling device as claimed in claim 4, said first urging means and said second urging means are torsion springs.

* * * * *